United States Patent
Mo et al.

(10) Patent No.: US 11,943,010 B2
(45) Date of Patent: Mar. 26, 2024

(54) COMPOSITE BEAM PAIRING

(71) Applicant: Samsung Electronics Co., Ltd., Suwon-si (KR)

(72) Inventors: Jianhua Mo, Allen, TX (US); Jeehwan Noh, Suwon-si (KR); Boon Loong Ng, Plano, TX (US); Ahmad AlAmmouri, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/810,246

(22) Filed: Jun. 30, 2022

(65) Prior Publication Data

US 2023/0006714 A1    Jan. 5, 2023

Related U.S. Application Data

(60) Provisional application No. 63/218,207, filed on Jul. 2, 2021.

(51) Int. Cl.
    *H04B 7/024* (2017.01)
    *H04B 7/06* (2006.01)
    *H04B 7/08* (2006.01)

(52) U.S. Cl.
    CPC .......... *H04B 7/024* (2013.01); *H04B 7/0639* (2013.01); *H04B 7/0695* (2013.01); *H04B 7/0854* (2013.01)

(58) Field of Classification Search
    CPC .... H04B 7/024; H04B 7/0639; H04B 7/0695; H04B 7/0854
    See application file for complete search history.

(56) References Cited

U.S. PATENT DOCUMENTS

| | | | |
|---|---|---|---|
| 10,425,910 B1 | 9/2019 | Pajovic et al. | |
| 11,115,087 B2 | 9/2021 | Kim et al. | |
| 11,134,395 B2 | 9/2021 | Bengtsson et al. | |
| 11,206,071 B2 | 12/2021 | Raghavan et al. | |
| 2015/0257073 A1* | 9/2015 | Park | H04L 5/0048 370/331 |
| 2018/0109303 A1* | 4/2018 | Yoo | H04B 7/0619 |
| 2019/0021017 A1* | 1/2019 | Nagaraja | H04W 72/51 |
| 2019/0124610 A1* | 4/2019 | Stirling-Gallacher | H04B 7/0617 |
| 2019/0349031 A1 | 11/2019 | Xiang et al. | |
| 2020/0287677 A1* | 9/2020 | Kakishima | H04L 5/0048 |

(Continued)

FOREIGN PATENT DOCUMENTS

| | | |
|---|---|---|
| CN | 113300745 A | 8/2021 |
| WO | 2020167197 A1 | 8/2020 |
| WO | 20210028021 A1 | 2/2021 |

OTHER PUBLICATIONS

International Search Report and Written Opinion dated Oct. 4, 2022 regarding International Application No. PCT/KR2022/009540, 7 pages.

*Primary Examiner* — Jaison Joseph

(57) ABSTRACT

Apparatuses and methods for composite beam paring in a wireless communication system. A method includes identifying, based on one or more user equipment (UE) reports, information on a plurality of narrow beams; determining beam correlation information for the plurality of narrow beams based on the one or more UE reports; and determining pairs of narrow beams from among the plurality of narrow beams based on the correlation information.

20 Claims, 14 Drawing Sheets

(56) References Cited

U.S. PATENT DOCUMENTS

| | | | |
|---|---|---|---|
| 2021/0111773 A1* | 4/2021 | Kakishima | H04W 76/27 |
| 2021/0152233 A1* | 5/2021 | Pan | H04B 7/0691 |
| 2021/0195572 A1 | 6/2021 | Guan et al. | |
| 2022/0286192 A1* | 9/2022 | Xi | H04B 7/088 |
| 2023/0006714 A1* | 1/2023 | Mo | H04B 7/0639 |

* cited by examiner $a_{il}a_{jk} = 1$ $a_{ik}a_{jl} = 1$

COMPOSITE BEAM PAIRING

CROSS-REFERENCE TO RELATED AND CLAIM OF PRIORITY

The present application claims priority under 35 U.S.C. § 119(e) to U.S. Provisional Patent Application No. 63/218,207 filed on Jul. 2, 2021, which is hereby incorporated by reference in its entirety.

TECHNICAL FIELD

The present disclosure relates generally to wireless communication systems and, more specifically, the present disclosure relates to apparatuses and methods to pair or group beams into composite beams.

BACKGROUND

As wireless communication has grown and the number of subscribers to wireless communication services continues to grow quickly, demand of wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since deployment of 4G communication systems, and to enable various vertical applications, 5G (e.g., fifth generation) communication systems have been developed and are currently being deployed.

A basic philosophy of 5G or New Radio (NR) in 3rd Generation Partnership Project (3GPP) is to support beam-specific operations for wireless communication between a gNodeB (gNB) and a user equipment (UE). There are several components in the 5G NR specification that can efficiently be operated in a beam-specific manner. Note that the 5G communication system involves implementation to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support.

The mmWave beam codebook design is very important and challenging for the 5G mmWave base stations since, being different from low frequency bands, narrow beams are needed to support the high data transmission at the mmWave band due to the large mmWave band path-loss. A significant number of narrow beams may be needed to cover a wide angular region, for example, horizontally from −60 degree to +60 degree. On the other hand, due to the larger overhead of synchronization signal block (SSB) signaling (which refers to synchronization/physical broadcast channel (PBCH) block because the synchronization signal and PBCH channel are packed as a single block), especially in the 5G stand-alone system, the number of SSB beams, where each beam corresponding to an SSB index, cannot be large.

SUMMARY

The present disclosure relates to paring or grouping beams into composite beams.

In one embodiment, a method is provided. The method includes identifying, based on one or more UE reports, information on a plurality of narrow beams; determining beam correlation information for the plurality of narrow beams based on the one or more UE reports; and determining pairs of narrow beams from among the plurality of narrow beams based on the correlation information.

In another embodiment, an apparatus is provided. The apparatus comprises memory and a processor operably coupled to the memory. The processor is configured to identify, based on one or more UE reports, information on a plurality of narrow beams; determine beam correlation information for the plurality of narrow beams based on the one or more UE reports; and determine pairs of narrow beams from among the plurality of narrow beams based on the correlation information.

In yet another embodiment, a non-transitory, computer-readable medium is provided. The computer-readable medium includes program code that, when executed by a processor of an apparatus, causes the apparatus to identify, based on one or more UE reports, information on a plurality of narrow beams; determine beam correlation information for the plurality of narrow beams based on the one or more UE reports; and determine pairs of narrow beams from among the plurality of narrow beams based on the correlation information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
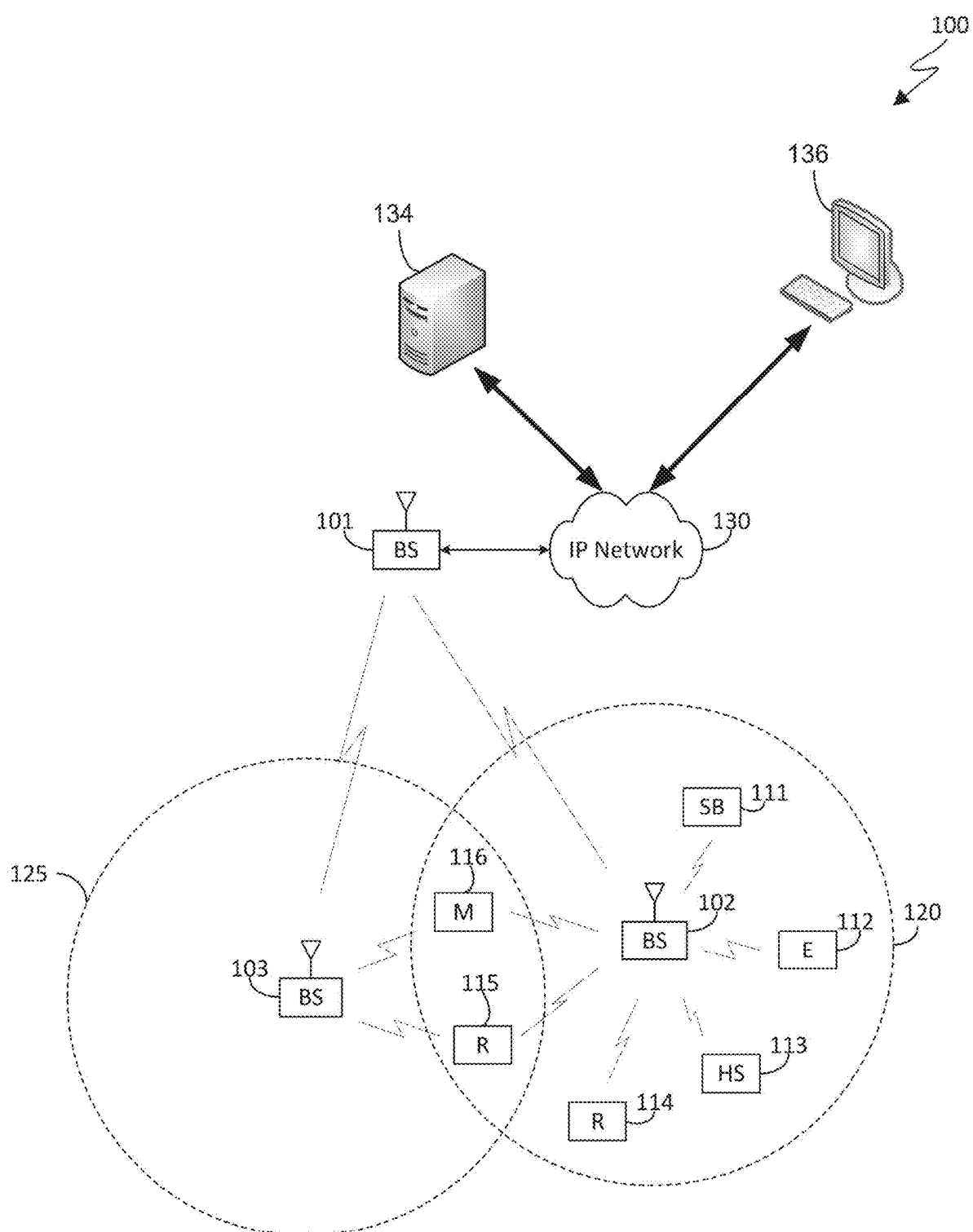
FIG. 1 illustrates an example wireless network according to various embodiments of the present disclosure.

FIG. 1 through FIG. 14, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to deployment of 5G communication systems, 6G or even later releases which may use terahertz (THz) bands.

In 5G or the other wireless systems, mm Wave is a major band on which high throughputs can be achieved. The propagation on the mm Wave bands suffers more significant path loss than that in the sub-6 GHz bands. To compensate the increased path loss, multiple antenna elements can be simultaneously activated to form a narrow beam with high gain. The narrow beamwidth, however, incurs an overhead for aligning the beam direction to the best signal transmission/reception directions.

Various embodiments of the present disclosure recognize that, for composite beam operation, the pairing of the narrow beams has to be carefully designed. If the paired beams' angles are close to each other, there can be strong interference to each other, for example the side lobe of one beam could be strong at the main lobe of the other beam.

It is noted that a composite beam system can also be implemented with three (or more) narrow beams for a single SSB index. The term "narrow beam" is used here since a large antenna array which is a typical setup for 5G mmWave network deployment is capable of forming narrow beams; however, the various embodiments in this disclosure can be applied to other composite beam systems with any beam width. Many beams, e.g., >100 may be needed to cover a wide angular region. The number of SSB beams, where each beam corresponds to an SSB index, cannot be large, especially in the 5G standalone (SA) system. 5G NR supports at most 64 SSBs for mmWave.

Various embodiments of the present disclosure present methods to generate the beam paring for the BS. The methods use input information including the individual beam pattern, the pointing angle of the individual beams. Although mmWave bands are used as example in this disclosure, the non-limiting embodiments in this disclosure can also be applied to other frequency bands as well.

Various embodiments of the present disclosure also recognize that formulating a composite beam (CB) pairing enhancement can be used to design an automatic pairing method that finds the optimal pairing that maximizes the intra-pair distance. Large intra-pair distance leads to less interference within the pair. These design specifications can be requirements of the system, for the base station to maintain contact with the UE, or any other feature that would be advantageous to the design of the CBs or a codebook. Moreover, various embodiments of the present disclosure permit the codebook to offer different types, shapes, and powers of CBs to accomplish the objectives of using CBs to cover narrow beam areas or volumes more efficiently.

Additionally, various embodiments of the present disclosure also provide for a method of using method to maximize both the intra-pair and inter-pair distance that can overcome error propagation. Large inter-pair distance can reduce the chance of error propagation and adopting a CB codebook with less errors and interference to support mobile UE.

Moreover, various embodiments of the present disclosure also provide examples of a composite beam system, where the BS uses two arrays to transmit the two narrow beams at the same time (one array for one narrow beam). One approach to reduce the number of SSB beams is to implement a composite beam system, where the BS transmits two narrow beams simultaneously for one SSB (same SSB index), and thereby halving the number of SSBs for the network. Thus, for a composite beam system, a BS transmits two narrow beams simultaneously for one SSB halving the number of SSBs, where the beam search could be for instance 28 CBs+2 (or 1) NB search. To pair the beams, search accuracy such that, for example, the percentage that the 28+2 (or 1) beam search arrives at the same result as the 56-beam search. The intra-pair distance should be large such that there is less beam pattern distortion when they are transmitted simultaneously.

Before further addressing the methods and devices used to effectuate the solutions discussed herein, various physical embodiments are shown in FIGS. 1 through 5 below, which describe such various embodiments implemented in wireless communications systems and with the use of orthogonal frequency division multiplexing (OFDM) or orthogonal frequency division multiple access (OFDMA) communication techniques. The descriptions thereof are not meant to imply physical or architectural limitations to the manner in which different embodiments may be implemented. Different embodiments of the present disclosure may be implemented in any suitably arranged communications system.

FIG. 1 illustrates an example wireless network according to various embodiments of the present disclosure. The non-limiting embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 can also communicate with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, Wi-Fi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include one or more two-dimensional (2D) antenna arrays and utilize paring or grouping of beams transmitted thereby into composite beams as described in various embodiments of the present disclosure.

In some embodiments, the network 130 facilitates communications between at least one server 134 and various client devices, such as client device 136. Server 134 includes any suitable computing or processing device that can provide computing services for one or more client devices. Server 134 could, for example, include one or more processing devices, one or more memories storing instructions and data, and one or more network interfaces facilitating communication over the network 130.

Client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device could communicate directly with the network 130 or indirectly with the network 130 via any suitable intermediate device(s) or network(s).

As described in more detail below, wireless network 100 can be a 5G communication system in which the BS 102 can utilize paring or grouping of beams for use in wireless communication. In addition, wireless network 100 can enable a computing device, such as server 134 or client device 136, to design and disseminate codebooks or elements thereof for composite beams generated offline from communication in the network 100.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
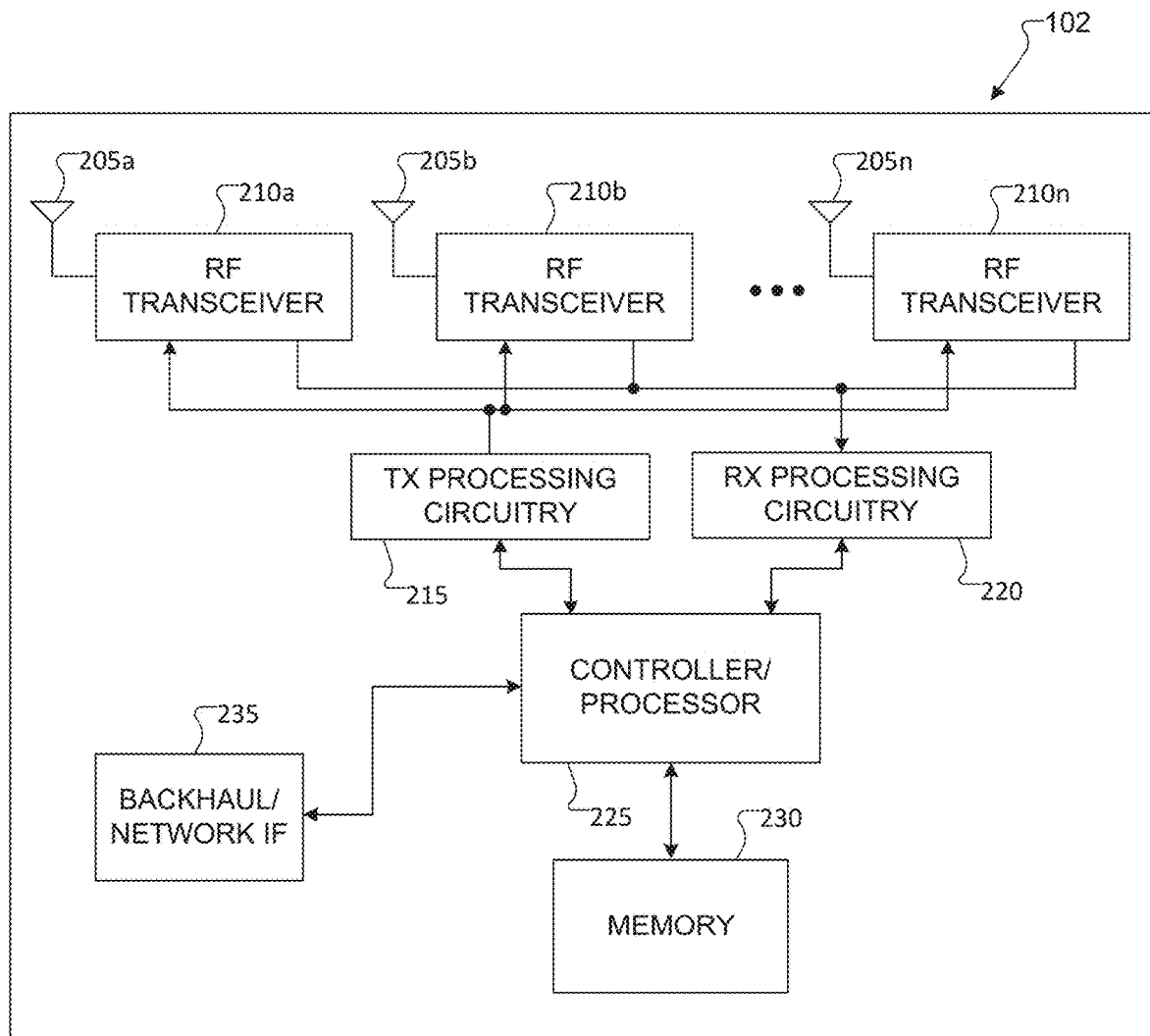
FIG. 2 illustrates an example base station (BS) according to various embodiments of the present disclosure.

FIG. 2 illustrates an exemplary base station example gNB 102 according to various embodiments of the present disclosure. The non-limiting embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate intermediate frequency (IF) or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform the method in part or in whole described herein, identify inputs, and create the codebook. Also, any of a wide variety of other functions can be supported in the gNB 102 by the controller/processor 225. In some embodiments, the controller/processor 225 includes at least one microprocessor or microcontroller.

In certain embodiments, the controller/processor 225 could support beam forming or directional routing operations in which outgoing signals from multiple antennas 205a-205n are weighted differently to effectively steer the outgoing signals in a desired direction and create and control narrow beans and composite beams. Any of a wide variety of other functions could be supported in the gNB 102 by the controller/processor 225.

The controller/processor 225 is also capable of executing programs and other processes resident in the memory 230, such as an operating system (OS). The controller/processor 225 can move data into or out of the memory 230 as used by an executing process. The controller/processor 225 is also capable of determining and/or using composite beams for communications such as SSB transmissions as described in various embodiments of the present disclosure.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other read only memory (ROM). In certain embodiments, a plurality of instructions, such as an integer linear programming (ILP) algorithm is stored in memory 230. The plurality of instructions is configured to cause the controller/processor 225 to determine, based on UE reports, composite beams from among a plurality of beams transmitted by the BS 102 as described in more detail below.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
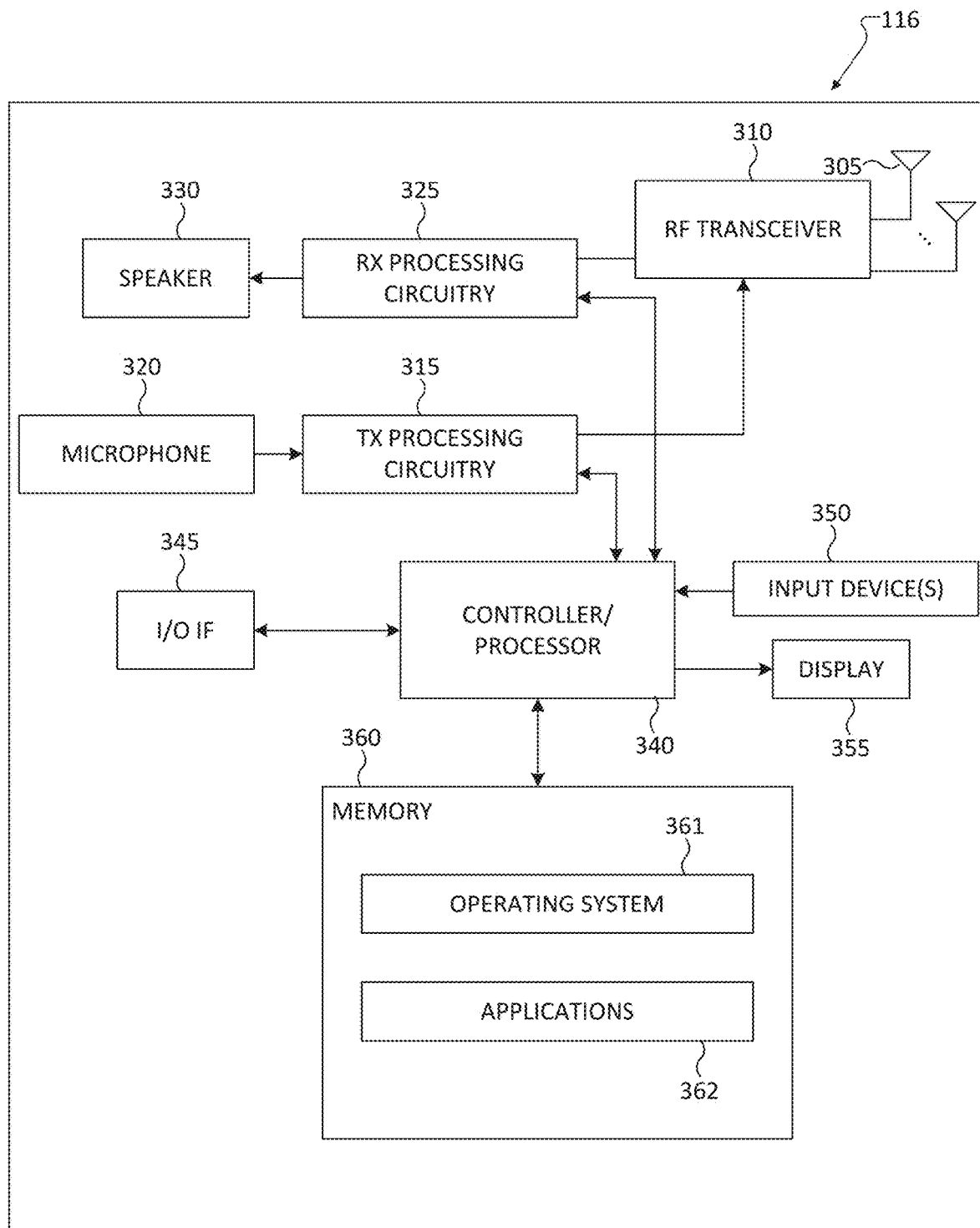
FIG. 3 illustrates an example UE according to various embodiments of the present disclosure

FIG. 3 illustrates an example UE 116 according to various embodiments of the present disclosure. The non-limiting embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a controller/processor 340, an input/output (I/O) interface (IF) 345, a touchscreen 350 (or keypad), a display 355, and a memory 360. The memory 360 includes an operating system (OS) 361 and one or more applications 362.

The RF transceiver 310 receives from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller/processor 340 for further processing (such as for web browsing data).

The TX processing circuitry 315 receives analog or digital voice data from the microphone 320 or other outgoing baseband data (such as web data, e-mail, or interactive video game data) from the controller/processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The controller/processor 340 can include one or more processors or other processing devices and execute the OS 361 stored in the memory 360 in order to control the overall operation of the UE 116. For example, the controller/processor 340 could control the reception of forward channel signals and the transmission of reverse channel signals by the RF transceiver 310, the RX processing circuitry 325, and the TX processing circuitry 315 in accordance with well-known principles. In some embodiments, the controller/processor 340 includes at least one microprocessor or microcontroller.

The controller/processor 340 is also capable of executing other processes and programs resident in the memory 360. The controller/processor 340 can move data into or out of the memory 360 as used by an executing process. In some embodiments, the controller/processor 340 is configured to execute the applications 362 based on the OS 361 or in response to signals received from gNBs or an operator. The controller/processor 340 is also coupled to the I/O interface 345, which provides the UE 116 with the ability to connect to other devices, such as laptop computers and handheld computers. The I/O interface 345 is the communication path between these accessories and the controller/processor 340.

The controller/processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the controller/processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the controller/processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
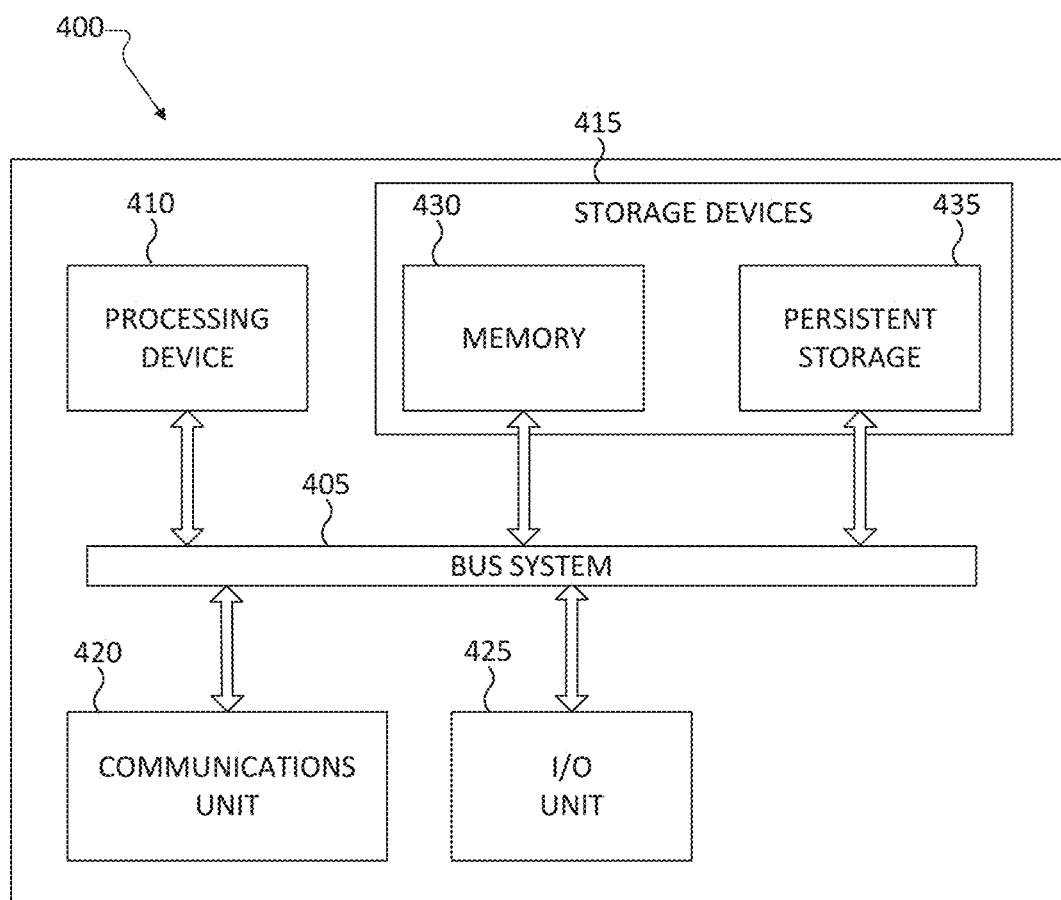
FIG. 4 illustrates a diagram of a computing device according to various embodiments of the present disclosure.

FIG. 4 illustrates an example of a computing device 400 in accordance with various embodiments of this disclosure. In one embodiment, the computing device 400 is a server, such as server 134 in FIG. 1 or a client device, such as client device 136 in FIG. 1. As described in greater detail below, in various embodiments, the computing device 400 can determine composite beams for use by a BS 102 based on UE reports. The computing device 400 may designate these parings, for example, using codebooks generated offline from communication by the BS 102.

As shown in FIG. 4, the computing device 400 includes a bus system 405, which supports communication between at least one processor 410, at least one storage device 415, at least one communications unit 420, and at least one input/output (I/O) unit 425. The processor 410 executes instructions that may be loaded into a memory 430. The processor 410 may include any suitable number(s) and type(s) of processors or other devices in any suitable arrangement. Examples of types of processor 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random-access memory or any other suitable volatile or non-volatile storage device(s). The persistent storage 435 may contain one or more components or devices supporting longer-term storage of data, such as a ready only memory, hard drive, flash memory, or optical disc.

The communications unit 420 supports communications with other systems or devices. For example, the communications unit 420 could include a network interface card or a wireless transceiver facilitating communications over the network 130. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 134 of FIG. 1, the same or similar structure could be used in one or more client devices. For example, client device 136 can have the same or similar structure as shown in FIG. 4.

As described in more detail below, a computing device such as server 134 in FIG. 1 can be used to design and disseminate codebooks for use by an electronic device, such as UE 116 and/or BS 102 for communicating over network 100 or may be used to store and calculate data used for the implementation of the method described herein, especially in situations where real-time data is not necessary or, on the other hand, where the calculations are more efficiently or effectively done by the networked computing device 400. The networked computing device 400 could also maintain or determine any data or calculations that can be done offline and then transmitted to another component in network 100.

Figure 5:
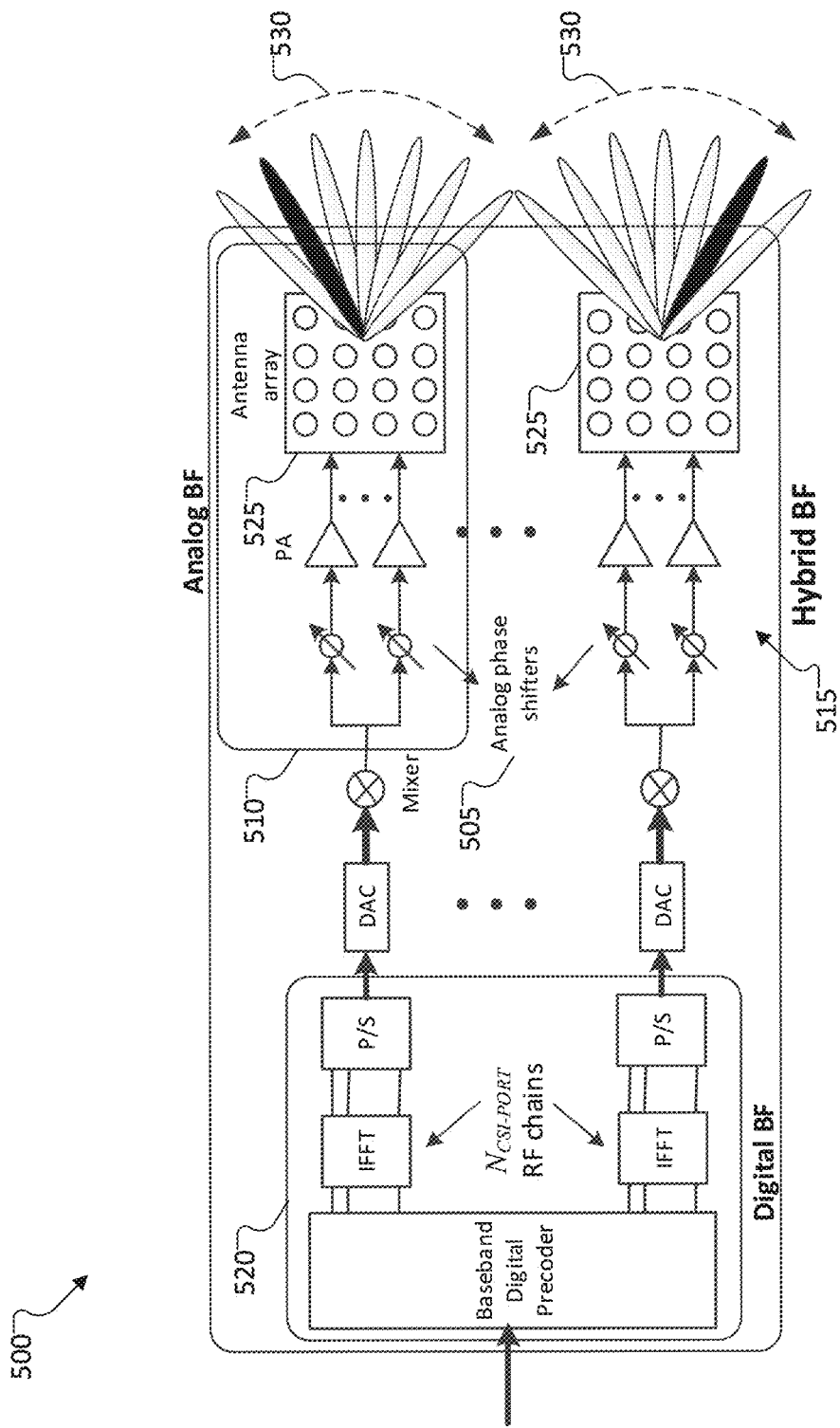
FIG. 5 illustrates an example of a transmitter structure for beamforming according to various embodiments of the present disclosure.

FIG. 5 illustrates an example of a transmitter structure 500 for beamforming according to various embodiments of the present disclosure. The non-limiting embodiment of the transmitter structure 500 illustrated in FIG. 5 is for illustration only. FIG. 5 does not limit the scope of this disclosure to any particular implementation of the transmitter structure 500. In certain embodiments, one or more of gNB 102 or UE 116 include the transmitter structure 500. For example, one or more of antenna 205 and its associated systems or antenna 305 and its associated systems can be included in transmitter structure 500.

Rel.14 LTE and Rel.15 NR support up to 32 Channel State Information Reference Signal (CSI-RS) antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converters (ADCs) and digital-to-analog converters (DACs) at mmWave frequencies).

In the example shown in FIG. 5, the transmitter structure 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

As operating frequency bands in NR become higher, the UE may include a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize.

As an example, a beam corresponds to a spatial transmission/reception filter that is used by the UE 116 and/or gNB 102. In one example, a beam can correspond to a spatial reception filter that is used by the UE 116 to receive a signal, such as SSB (or SS/PBCH block) and/or a CSI-RS and so on. In another example, a beam can correspond to a spatial transmission filter that is used by the UE 116 to transmit a reference signal, such as an UL sounding reference signal (SRS) and so on.

A beam reporting procedure for a UE can include, for example, a procedure wherein the gNB 102 configures the UE 116 with a set of reference signal (RS) resources, such as CSI-RS resources, as well as a configuration for report settings, such that the UE can generate and send UE reports including information indicating beam quality metric(s) measurement(s), such as channel state information (CSI), reference signal received power (RSRP), reference signal received quality (RSRQ), received signal strength indicator (RSSI), signal to noise ratio (SNR), signal to interference and noise ratio (SINR), and so on, as well as information about beam locations, such as, beam pattern, pointing angle of individual beams, etc. In one example, a gNB 102 can transmit a RS, such as a SSB or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as RSRP or SINR.

Various embodiments of the present disclosure provide for methods and devices to generate beam parings for the BS. The methods use input information including, for example, the individual beam pattern, the pointing angle of the individual beams. Although mmWave bands are used as example in this disclosure, embodiments of the present disclosure can also be applied to other frequency bands as well.

Figure 6A:
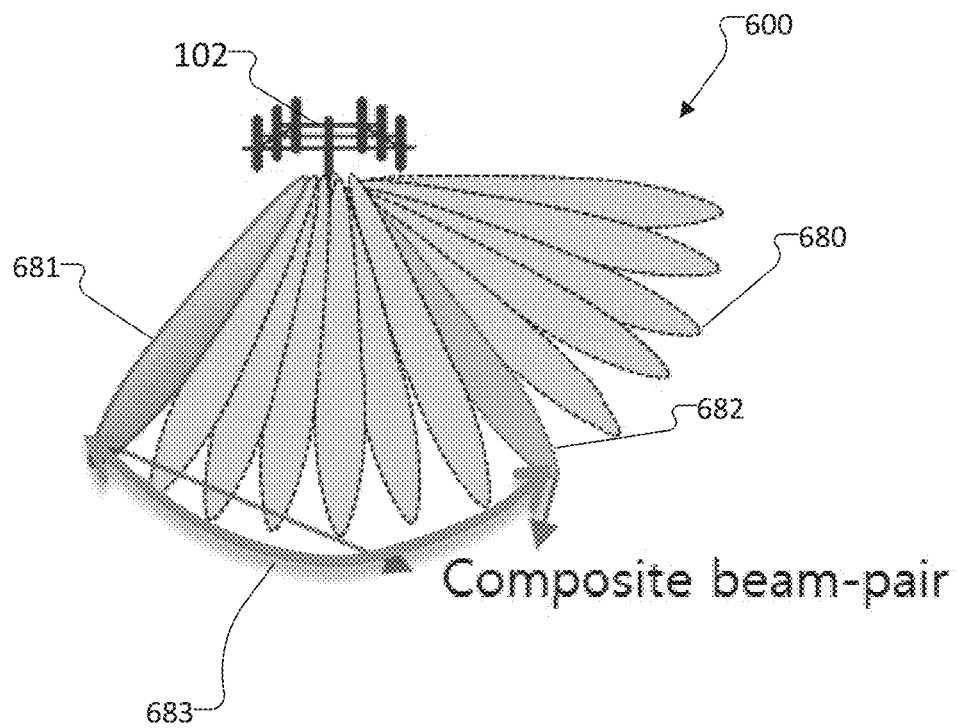
FIGS. 6A and 6B illustrate examples of a composite beam system with two arrays at the BS according to various embodiments of the present disclosure.
Figure 6B:
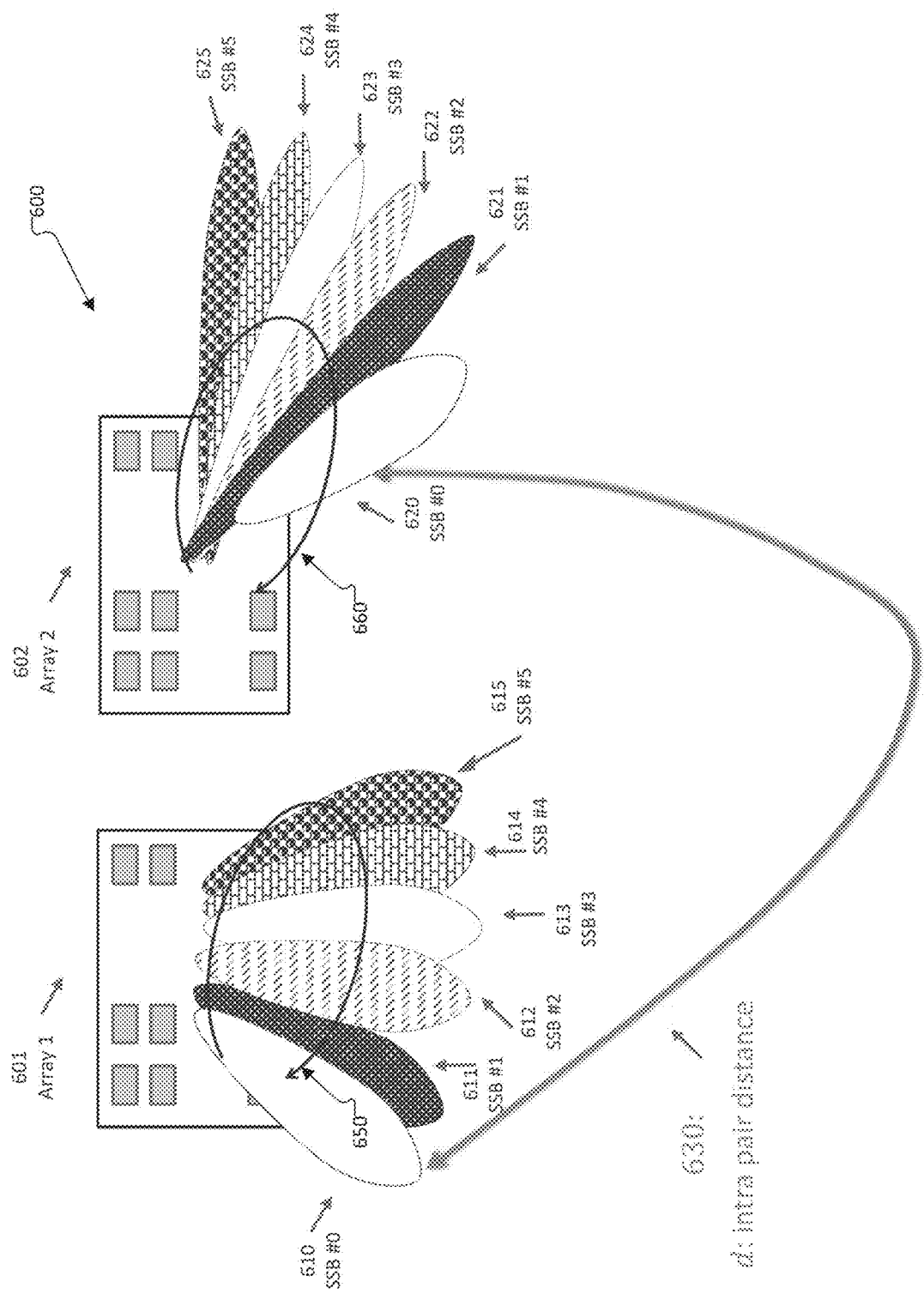

FIGS. 6A and 6B illustrate examples of a composite beam system 600 with at least two arrays at a BS according to various embodiments of the present disclosure. The system 600 is for illustration only and other embodiments can be used without departing from the scope of the present disclosure.

In these examples, the composite beam system 600 includes the BS 120 that uses (at least) two arrays to transmit the two narrow beams at the same time (one array for one narrow beam). These beams are paired to form composite beams. In particular system 600 includes the BS 102, which transmits beams (e.g., beams 610-615, 620-625, and 680-683) from at least two antenna panels 601 and 602, such as antenna panels 525 from FIG. 5. In the example shown in FIG. 6A, beam 681 and beam 682 are paired and where arrow 683 represents the distance of the composite beampair. In the example shown in FIG. 6B, panel 601 emits narrow beam coverage 650 with narrow beams 610 through 615 respectively with SSB #0-5, while panel 602 emits narrow beam coverage 660 with narrow beams 620 through 625, inclusive, respectively with SSB #0-5 as shown. Shown in this example, is a pairing between beams 610 and 620, with d as the intra-pair distance.

In various embodiments, beam pairings are generated to increase (or maximize) the intra-pair distance. In these embodiments, the beams with large angular distance are paired. The angular distance could be defined as the distance between the peak direction of two beams, i.e., the distance between $(\theta_i, \phi_i)$ and $(\theta_j, \phi_j)$. The distance could be computed as the great-circle distance as follows:

$$d_{ij} = \arccos([\sin \theta_i \cos \phi_i, \sin \theta_i \sin \phi_i, \cos \theta_i][\sin \theta_j \cos \phi_j, \sin \theta_j \sin \phi_j, \cos \theta_j]^T)$$

where $[\bullet]^T$ stands for the transpose of a vector. Define binary variables $z_{ij}=0$ if beam i and beam j is paired. Otherwise, $z_{ij}=0$.

In one example, the beams are paired to increase (or maximize) the minimal intra-pair distance $$\max_{\{z_{ij}\}} \min_{i,j,z_{ij}=1} d_{ij}.$$

In another example, the beams are paired to increase (or maximize) the average intra-pair distance, which is $$\max_{\{z_{ij}\}} \mathbb{E}_{i,j,z_{ij}=1} d_{ij}.$$

In yet another example, the beams are paired to increase (or maximize) the average intra-pair distance and limit the minimal distance to above a threshold T. For example, the problem formulation is:

$$\max_{\{z_{ij}\}} \mathbb{E}_{i,j,z_{ij}=1} d_{ij}$$
$$\text{s.t.,} \quad \min_{i,j,z_{ij}=1} d_{ij} > T$$

In another embodiment, the beams with minimal interference are paired. For an assumption that the beam pattern of all the narrow beams is known, $G_i(\theta, \phi)$, $1 \leq i \leq K$, where K is the number of beams and $G_i(\theta, \phi)$ is the i-th beam gain at the direction $(\theta, \phi)$. The main lobe of each beam is identified as a region around its peak direction $(\theta_i, \phi_i)$. The interference of beam i to beam j at j-th beam's peak direction is thus $G_i(\theta_j, \phi_j)$. The interference could also be defined over the main lobe region as well. Denote the interference from beam i to beam j as $I_{j \leftarrow i}$, and binary variables $z_{ij}=1$ if beam i is paired with beam j. In one option, the beams are paired to reduce (or minimize) the maximum interference, for example, based on the following equation:

$$\min_{\{z_{ij}\}} \max_{i,j,z_{ij}=1} I_{j \leftarrow i}.$$

In another example, the beams are paired to minimize the average interference, for example, based on the following equation:

$$\min_{\{z_{ij}\}} \mathbb{E}_{i,j,z_{ij}=1} I_{j \leftarrow i}.$$

In yet another example, the beams are paired to minimize the average interference, and limit the maximal interference to below a threshold T. For example, the problem formulation is:

$$\min_{\{z_{ij}\}} \mathbb{E}_{i,j,z_{ij}=1} I_{j \leftarrow i}$$
$$\text{s.t.,} \quad \max_{i,j,z_{ij}=1} I_{j \leftarrow i} < T$$

Figure 7B:
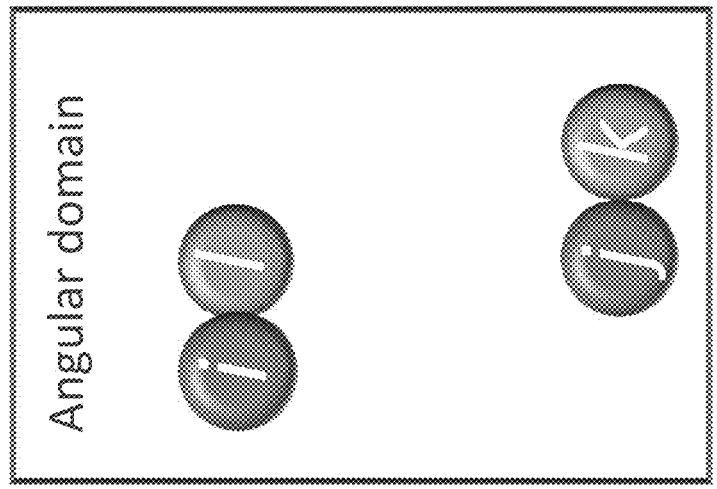
FIGS. 7A and 7B illustrate examples of beam pairs according to embodiments of the present disclosure.
Figure 7A:
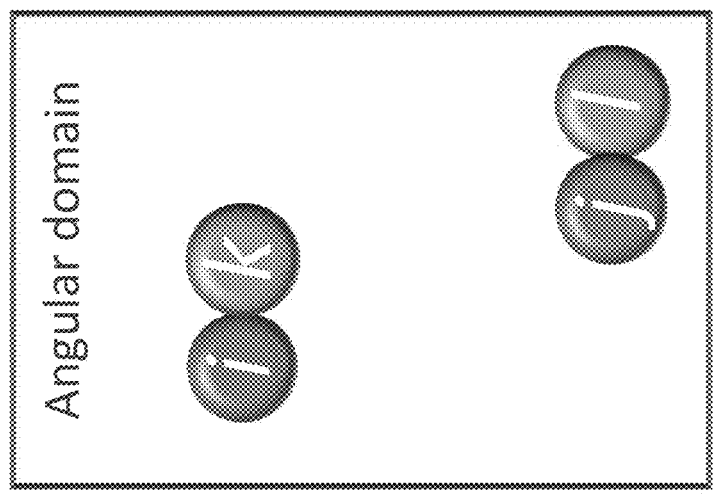

FIGS. 7A and 7B illustrate examples of beam pairs according to embodiments of the present disclosure. The examples of beam pairs in FIGS. 7A and 7B are for illustration only and other embodiments can be used without departing from the scope of the present disclosure.

In these examples, the narrow beams are illustrated the angular domain with FIG. 7A showing pair (i,j) and FIG. 7B showing pair (k,l) which both are resultant composites of narrow beams with large intra-pair distance but small inter-pair distance. In FIG. 7A, beams i and k are adjacent and beams j and beam l are adjacent. In FIG. 7B, beams i and l are adjacent, while beams j and k are adjacent. Each circle represents the main lobe of a narrow beam. Beam i and j are paired, and beam k and l are paired in FIGS. 7A and B. In both figures, the pair (i,j) and pair (k,l) have large intra-pair distance, but small inter-pair distance.

In various embodiments, the beam pairing is selected or optimized to increase (or maximize) both the intra-pair distance and the inter-pair distance. The increased inter-pair distance might reduce the chance of choosing the wrong narrow beam. The inter-pair distance between two pairs (i,j) and (k,l) could be defined as $\min(d_{ik}+d_{jl}, d_{il}+d_{jk})$. The beam pairing shown in FIGS. 7A and 7B may not be desired when the inter-pair distance is small.

In another embodiment, the beam pairing is selected or optimized to reduce (or minimize) both the intra-pair and inter-pair interference. The intra-pair interference between two pairs (i,j) and (k,l) could be $\max(I_{k \leftarrow i}+I_{l \leftarrow j}, I_{l \leftarrow i}+I_{k \leftarrow j})$.

Figure 8:
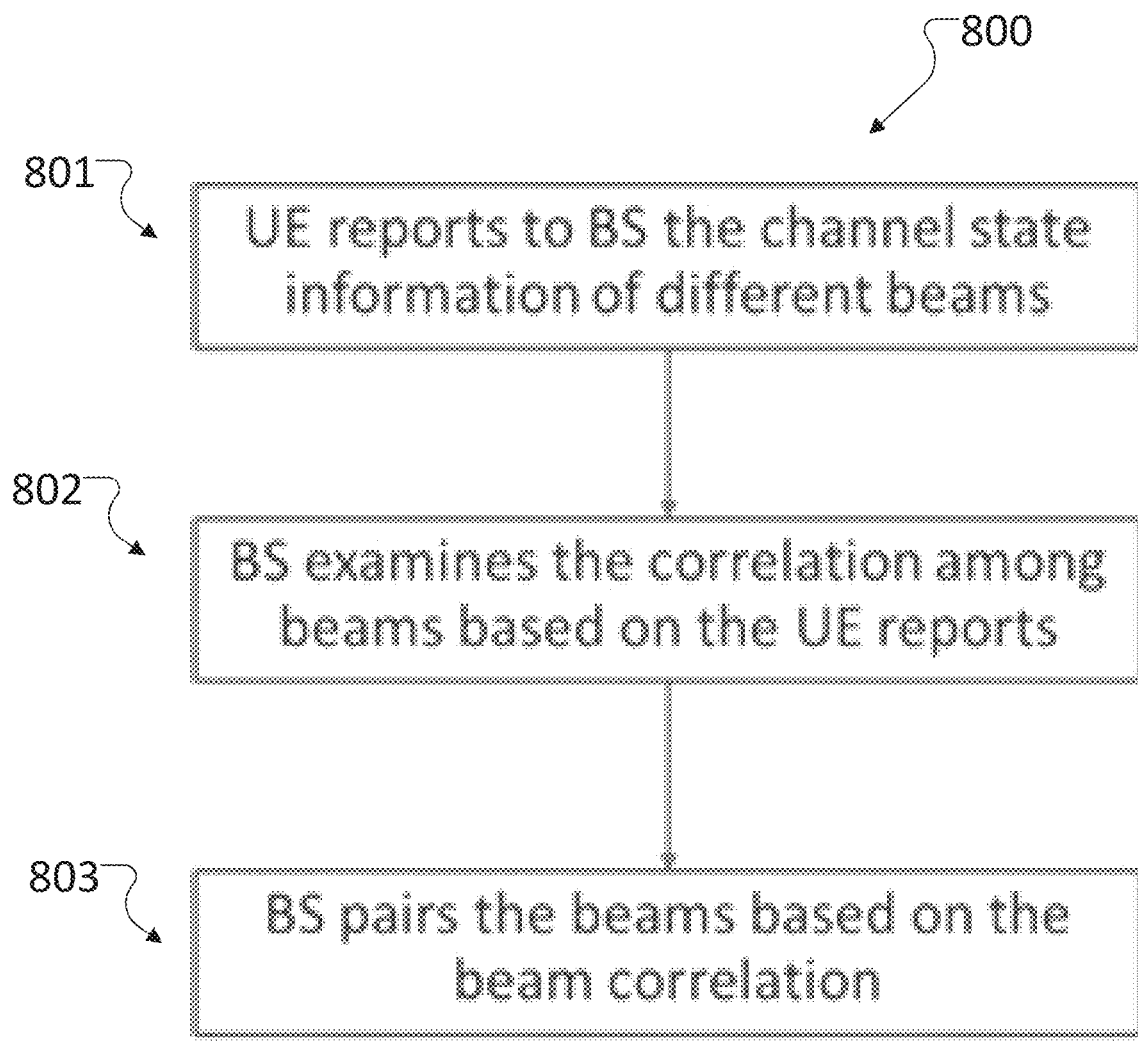
FIG. 8 illustrates an example of a flowchart for beam pairing based on UE reports according to embodiments of the present disclosure.

FIG. 8 illustrates an example of a flowchart of a method 800 for beam pairing based on UE reports according to various embodiments of the present disclosure. The steps of the method 800 of FIG. 11 can be performed by any of the UEs 111-116 in connection with the BSs 101-103 of FIG. 1, such as the BS 102 of FIG. 2. The method 800 is for illustration only and other embodiments can be used without departing from the scope of the present disclosure.

In various embodiments, the beam paring is done by the BS, for example, periodically or dynamically, in an online manner. In other embodiments, the beam paring may be done offline by a computing device for example using simulations with beam parings indicated in codebooks that are sent to the BS for use. One such example of an online manner is illustrated by the method 800 which begins with the UE reporting to the BS CSI of different beams (step 801). In step 802, the BS examines the correlation among the beams based on the UE reports. In step 803, the BS pairs beams based on the beam correlation.

In various embodiments, the online beam pairing is performed to reduce (or minimize) the intra-pair correlation. In one embodiment, the pairing could be paired based on the UE report, and the beam with least correlation are paired. For example, if there are K beams and the reported L1-RSRP or CQI value is $x=[x_1, x_2, x_3, \ldots, x_K]^T$. If there is not full report from UE (for example, UE only reports the best 4 beams' index and RSRP values), then a default value is assigned to the missing beams. Then, the correlation could be computed as $$R_{xx} = \mathbb{E}_x[xx^H].$$

The average is over all the reports that a BS receives from all the UEs over a sufficient long period (e.g., hours, days). The BS could compute $R_{xx}$ in a recursive manner. The beam pair with reduced (or minimal) correlation (e.g., which implies that the experienced channels are uncorrelated, or pointing angles are far apart, or the interference between the two beam patterns is small) are paired. The BS could continuously monitor and update the $R_{xx}$ based on the online UE report. As such, this online pairing based on the correlation can pair beams to reduce (or minimize) the maximal intra-pair correlation, which may perform better than the angle-based pairing in a non-line of sight (NLOS) environment.

In various embodiments, the beams are paired to minimize the sum intra-pair correlation, or minimize the maximal intra-pair correlation, or minimize the sum intra-pair correlation while limiting the maximal intra-pair correlation.

Figure 9A:
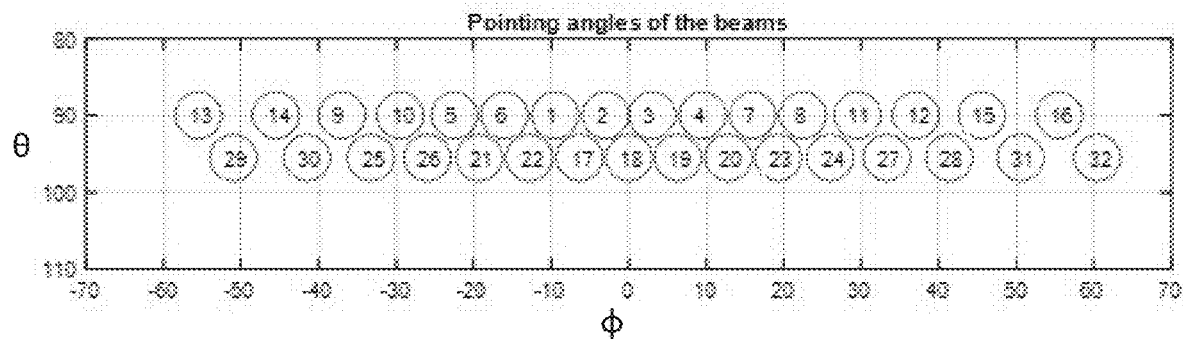
FIGS. 9A and 9B illustrate examples of different numbers of narrow beams in an angular domain according to various embodiments of the present disclosure.
Figure 9B:
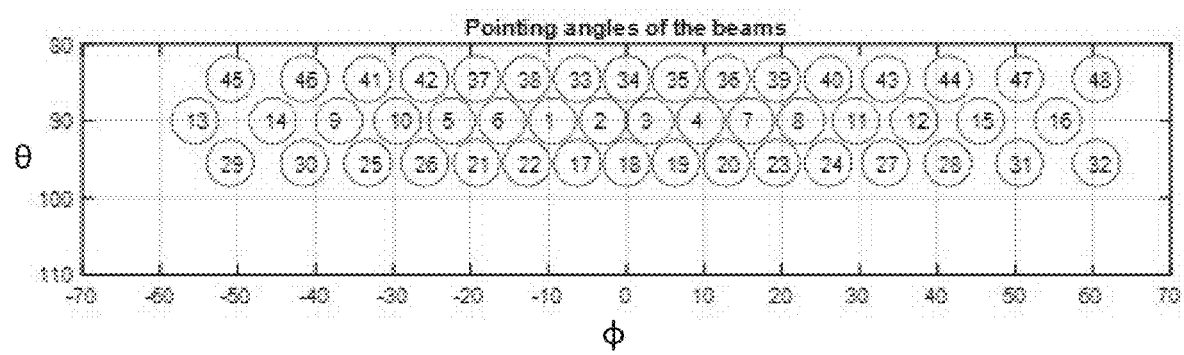
Figure 10:
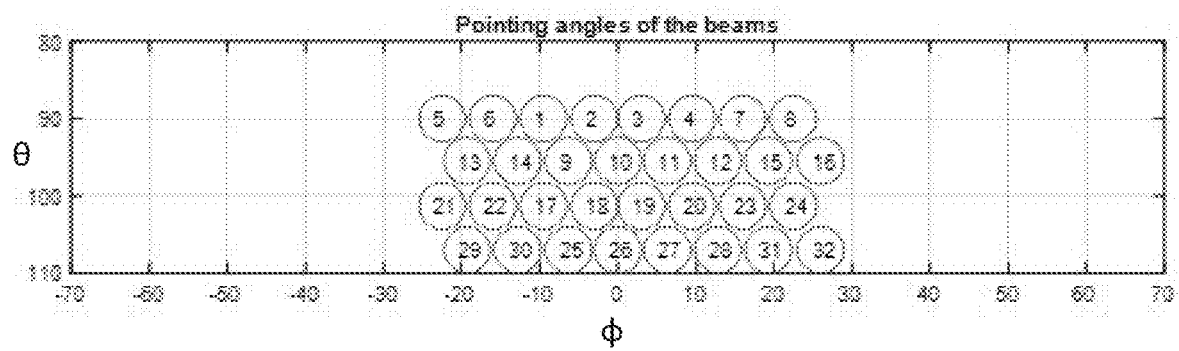
FIG. 10 illustrates an example a size-32 codebook with different pointing angles from FIG. 9A according to various embodiments of the present disclosure.
Figure 11:
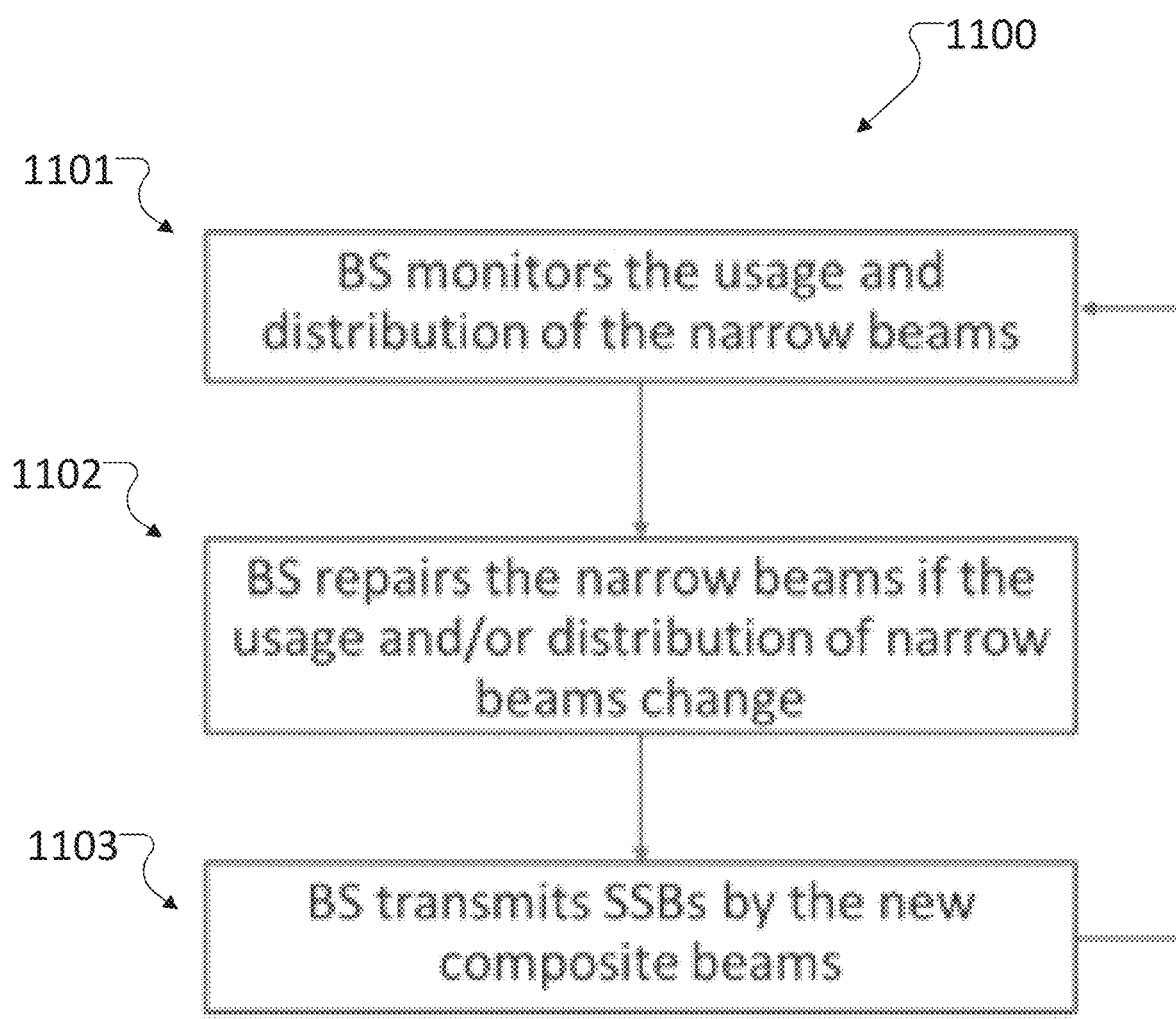
FIG. 11 illustrates a flowchart for beam pairing adapting based on narrow beam usage or distribution according to various embodiments of the present disclosure.

FIGS. 9A and 9B illustrate examples of different numbers of narrow beams in an angular domain according to various embodiments of the present disclosure. FIG. 10 illustrates an example a size-32 codebook with different pointing angles from FIG. 9A according to various embodiments of the present disclosure. FIG. 11 illustrates a flowchart of a method 1100 for beam pairing adapting based on narrow beam usage or distribution according to various embodiments of the present disclosure. The steps of the method 1100 of FIG. 11 can be performed by any of the BSs 101-103 of FIG. 1, such as the BS 102 of FIG. 2. The examples illustrated in FIGS. 9A-11 are for illustration only and other embodiments can be used without departing from the scope of the present disclosure.

In various embodiments, online beam pairing adapts to the changes of narrow beam set. The narrow beam set could change due to the cell load, the UE distribution, the tilting angle of the BS, the BS height, etc. For an example, in an urban area, the UE distribution could change a lot during the day and night. Thus, the BS may dynamically change the set of narrow beams to better serve the UE. In another example, the scan range requirement of the BS varies when the BS height changes, for instance, from 10 meters to 30 meters. As a result, the narrow beam set, which is required to cover the scan range, changes with BS height.

In various examples, the change of narrow beam set includes, but not limited to: (1) the number of narrow beams increases or decreases or (2) the pointing angles or the covering regions of the narrow beams. As the number of narrow beams changes, some of the beams may not be paired, so a new pairing may be needed.

The method 1100 provides an example of online beam pairing that adapts to the narrow beams' usage and/or distribution. In step 1101, the BS (e.g., BS 102) monitors the usage and distribution of the narrow beams. In step 1102, the BS re-pairs the narrow beams if the usage and/or distribution of the narrow beams change. In step 1103, the BS transmits SSBs by the new composite beams. This procedure can be an iterative process in that step 1103 leads back to step 1101 as monitoring continues due to changing environments, movement of UEs, etc. In various embodiments, the beam pairing could change as the set of narrow beams change. Once the set of narrow beams changes, the BS can re-pair the narrow beams, following the methods provided in this disclosure.

In FIGS. 9A and 9B, the scan range of the narrow beam codebook expands to cover a larger cell or more UEs with different heights. The number of the narrow beams changes if a higher scan range is needed, for example, where the number of narrow beams increases from 32 in FIG. 9A to 48 in FIG. 9B, and a new pairing of narrow beams is then needed. Specifically, in FIG. 9A, a size-32 NB codebook with only two rows is displayed while in FIG. 9B a size-48 NB codebook with three rows is displayed.

FIG. 10 is an illustration of another example where the number of NBs does not change, but the pointing angles could change to better serve the UEs. For a size-32 NB codebook, the NB s could be distributed as shown in FIG. 10, where the horizontal coverage region is [−30°,30°]. This could happen when the UEs are concentrated in a small angular region, for example, a plaza area. Note that the pointing angles are different from FIG. 9A. Therefore, a different pairing may be needed.

In another embodiment, the BS could take into account the beam load when generating the composite beams. In other words, pairing based on the beam load. The beam load might be defined as the number of UE served by the beam, or the number of throughputs delivered by the beam to the served UEs. In one option, the beams with less load are paired, while the beam with high load are not paired. As a result, the load on the composite beams is more balanced. In another option, the beams with less load are grouped into big composite beams that include more than two narrow beams, while the beams with more load are grouped into small composite beams that include two or one narrow beams.

In various embodiments, the beam paring is performed using an ILP algorithm. For example, the composite beam design involves a pairing solution that increases (or maximizes) the intra-pair distance to reduce the intra-pair interference when forming composite-beam which can be formulated as an ILP problem, which assumes: the distance between beam i and beam j is $d_{ij}$; $z_{ij}=1$ if beam i and beam j are paired, otherwise $z_{ij}=0$; the objective is to increase (or maximize) the sum of the distance, where $d_{min}$ is a constraint on the minimum intra-pair distance. Given these assumptions, the ILP problem can be formulated based on the following:

$$\max_{z_{ij}} \sum_{i,j} d_{ij} z_{ij} \text{ (sum of the distance)}$$

$$\text{s.t. } z_{ij} = z_{ji}, \forall i, j \text{ (symmetry)}$$

$$\sum_{j} z_{ij} = 1, \forall i \text{ (pair once)}$$

$$z_{ij} d_{min} \leq d_{i,j}, \forall i, j \text{ (minimum distance)}$$

$$z_{ij} = 0 \text{ or } 1, \forall i, j \text{ (binary)}$$

For example, a MATLAB Mixed-Integer Linear Programming can be adopted to solve this problem, where finding the maximum $d_{min}$ is done by trial and error. Starting from $d_{min}=0$, then increase $d_{min}$ until the ILP becomes infeasible. In other examples, the ILP can be solved efficiently by available solvers. In another example, a bisection method could be adopted to determine $d_{min}$.

In various embodiments, the ILP algorithm can also take into account the intra-pair distance. For example, the distance between beam i and beam j is assumed to be $d_{ij}$ where $z_{ij}=1$ if beam i and beam j is paired, otherwise $z_{ij}=0$. The objective is to increase (or maximize) the sum of the distance, where $d_{min}$ is a constraint on the minimum intra-pair distance; $a_{ij}=1$ if beam i and beam j is adjacent, otherwise $a_{ij}=0$. The additional constraint on the inter-pair distance can be added in the end. The ILP problem can be formulated based on the following:

$$\max_{z_{ij}} \sum_{i,j} d_{ij} z_{ij} \text{ (sum of the intra-distance)}$$

$$\text{s.t. } z_{ij} = z_{ji}, \forall i, j \text{ (symmetry)}$$

$$\sum_j z_{ij} = 1, \forall i \text{ (pair once)}$$

$$z_{ij} d_{min} \leq d_{ij}, \forall i, j \text{ (minimum intra-pair distance)}$$

$$z_{ij} = 0 \text{ or } 1, \forall i, j \text{ (binary)}$$

$$z_{ij} + z_{kl} \leq 2 - a_{ik}a_{jl} - a_{il}a_{kj} \forall i, j, k, l \text{ (error propagation)}$$

where the error propagation shown above is also the equation for determining the inter-pair distance. For instance, if there is a choice between two clusters, without this additional check, then if the BS examines the narrow beam closer to a current one, then the RSRP measurement could be noisy, resulting in error. As such, beam section errors could also mount if a first selection is not optimal, propagating errors onward.

Figure 12A:
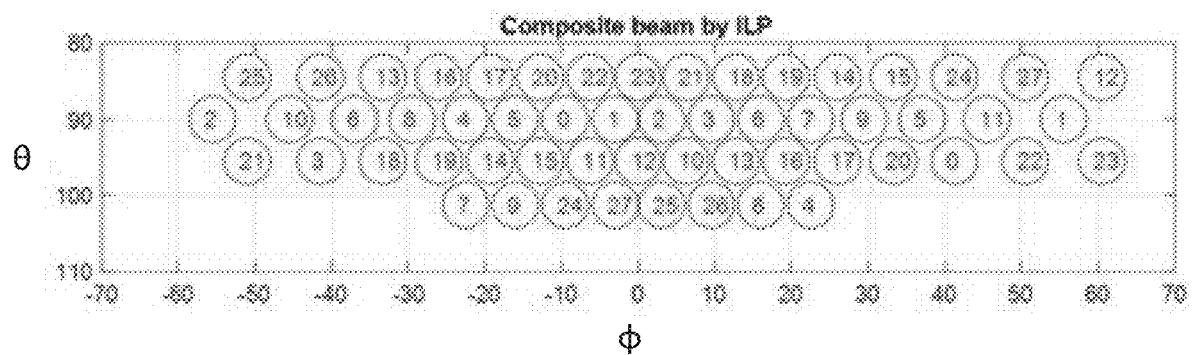
FIGS. 12A and 12B illustrate examples of composite beam pairing of 56 narrow beams according to various embodiments of the present disclosure.
Figure 12B:
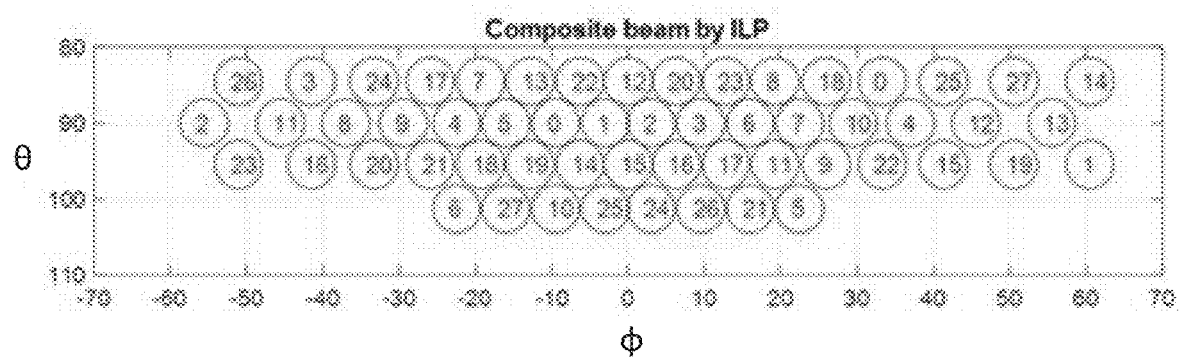

FIGS. 12A and 12B illustrate examples of composite beam pairing of 56 narrow beams according to various embodiments of the present disclosure. The examples illustrated in FIGS. 12A and 12B are for illustration only and other embodiments can be used without departing from the scope of the present disclosure.

FIGS. 12A and 12B are examples of the composite beam pairing of 56 narrow beams. FIG. 12A shows inter-pair distance increase (or maximization) per the techniques discussed in this disclosure. In this example, CB 4 and 8 are adjacent pairs. FIG. 12B illustrates an example for increases (or maximizes) the inter-pair and intra-pair distance as discussed above. In this example, there are no adjacent pairs. The example pairings of FIG. 12A may achieve both larger minimum and mean distances than a baseline pairing. The example pairings of FIG. 12B may also meet the request to reduce the error propagation as well as achieve a larger minimum distance than a baseline pairing.

Figure 13A:
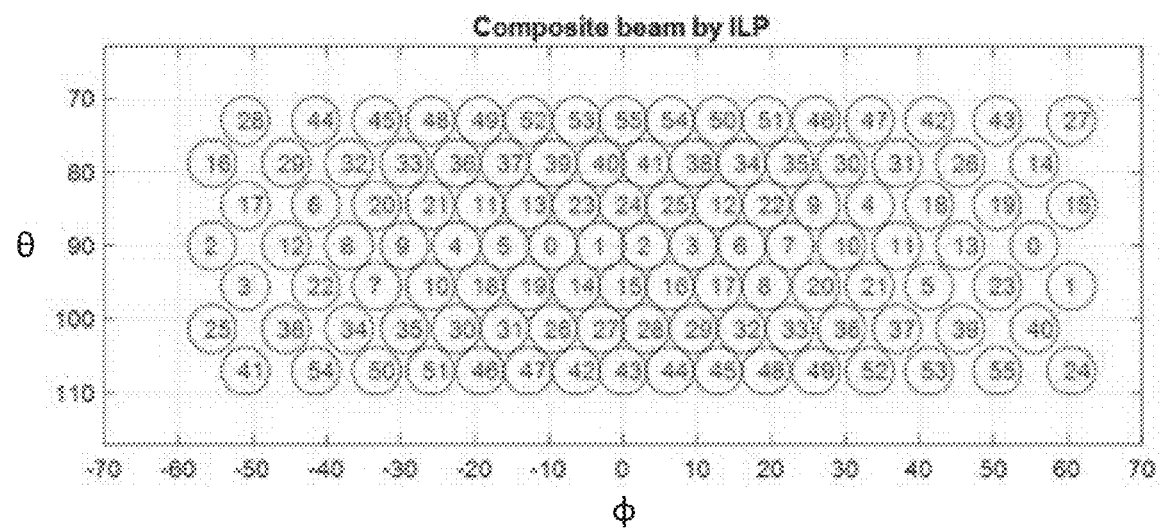
FIGS. 13A and 13B illustrate examples of composite beam pairing of 112 narrow beams according to various embodiments of the present disclosure.
Figure 13B:
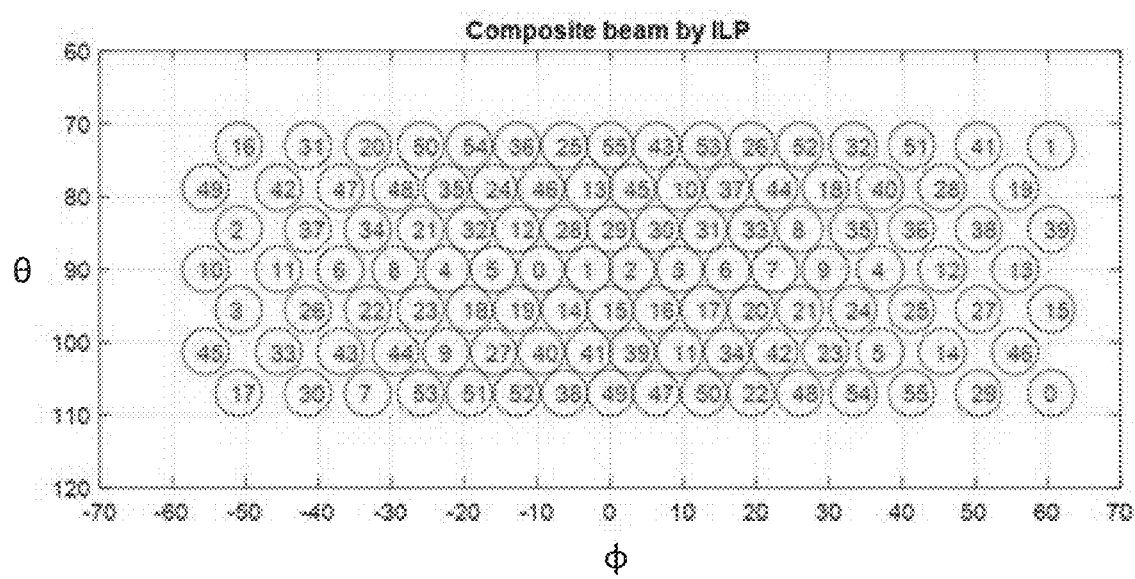

FIGS. 13A and 13B illustrate examples of composite beam pairing of 112 narrow beams according to various embodiments of the present disclosure. The examples illustrated in FIGS. 13A and 13B are for illustration only and other embodiments can be used without departing from the scope of the present disclosure.

FIGS. 13A and 13B are examples of the composite beam pairing of 112 narrow beams. FIG. 13A shows inter-pair distance maximization per the techniques discussed in this disclosure. In this example, CB 2 and 3 are adjacent pairs. FIG. 12B increases (or maximizes) the inter-pair and intra-pair distance. In this example, there are no adjacent pairs. The example pairings of FIG. 13A may achieve both larger minimum and mean distances than a baseline pairing. The example pairings of FIG. 13B may also meet the request to reduce the error propagation as well as achieve a larger minimum distance than a baseline pairing.

Figure 14:
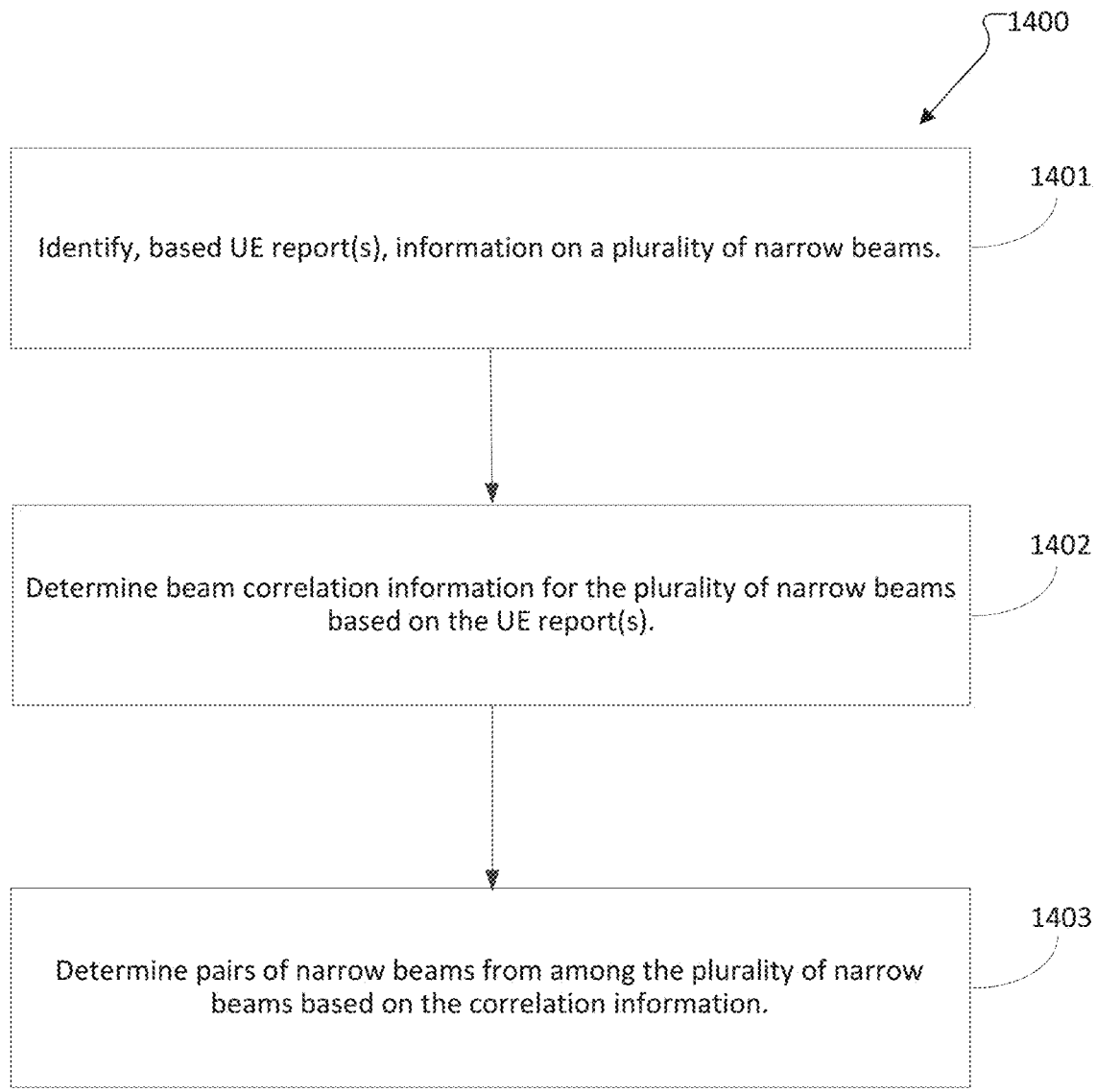
FIG. 14 illustrates a flowchart of a method for paring beams according to various embodiments of the present disclosure.

FIG. 14 illustrates an example method 1400 for paring beams according to various embodiments of the present disclosure. The steps of the method 1400 of FIG. 14 can be performed by any of the BSs 101-103 of FIG. 1, such as the BS 102 of FIG. 2 or by a computing device, such as, server 134, client device 136, or computing device 400 (referred to collectively as "the system"). The method 1400 is for illustration only and other embodiments can be used without departing from the scope of the present disclosure.

The method begins with the system identifying, based on one or more UE reports, information on a plurality of narrow beams (step 1401). For example, in step 1401, the system (e.g., computing device 400) may identify this information from offline reports to generate the parings in an offline methodology to provide predefined beam codebooks to a BS (e.g., BS 102). In another embodiment, the beam paring may be performed online by BS 102. In this example, the BS 102 may also transmit reference signals on the plurality of narrow beams and receive these UE report(s) from which to determine beam parings.

The system then determines beam correlation information for the plurality of narrow beams based on the one or more UE reports (step 1402). For example, in step 1402, the system may determine information about distances between respective beams in the set of beams as well as other information, such as, signal strengths, beam interference, UE indications of preferred beams, etc.

The system then determines pairs of narrow beams from among the plurality of narrow beams based on the correlation information (step 1403). Thereafter, for offline paring, the system may generate codebook(s) including the beam parings for use in a wireless communication system. For online paring, the BS may then use one or more of the determined pairs to transmit SSB(s) to UE(s) in the wireless communication system.

In step 1403, the system may determine pairs of narrow beams a function of a distance between beams in each respective pair of the pairs of narrow beams or intra-pair distance. For example, the system may determine the pairs of narrow beams to have a largest possible distance between the beams in each respective pair of the pairs of narrow beams among the plurality of narrow beams. This may allow for reduced interference between the beams in the respective pairs of narrow beams when transmitted. Additionally or alternatively, in step 1403, the system may determine the pairs of narrow beams as a function of a distance between beams in different pairs of the pairs of narrow beams or inter-pair distance. For example, the system may determine the pairs of narrow beams to have a largest possible distance between the different pairs of beams in the pairs of narrow beams. This may allow for reduced correlation between the different pairs of beams. For example, the pairs of the beams may be transmitted in different timeslots, thus not leading to inter-pair interference. However, reducing the correlation or similarity between the pairs may reduce the chance of error propagation between beam pairs. In various embodiments, the system may determine as a function of a distance between beams in each respective pair of the pairs of narrow beams and distance between beams in different pairs of the pairs of narrow beams or both intra and inter pair distance. For example, the system may use an ILP algorithm, such as one discussed above.

In various embodiments, the system may also determine the beam correlation information based on identifying a beam load for beams in the plurality of beams as discussed above. Here, the beam load may be based on a number of UEs served by a narrow beam or a throughput to be carried by a narrow beam. The system may determine the pairs of narrow beams comprises selecting beams to pair as a function of the beam load.

In various embodiments, the system may also receive updated UE reports including updated information on the plurality of narrow beams, determine information about an updated distribution of beams in the pairs of narrow beams based on the updated UE reports, and determine whether to modify paring of the pairs of narrow beams as a function of comparison of the updated distribution to a threshold values as discussed above, for example, with regard to FIG. 11.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   identifying, based on one or more user equipment (UE) reports, information on a plurality of narrow beams;
   determining beam correlation information for the plurality of narrow beams based on the identified information in the one or more UE reports;
   determining pairs of narrow beams from among the plurality of narrow beams based on increasing an intra-pair distance between a closest pair of the pairs of narrow beams in the beam correlation information; and
   transmitting information using at least one of the determined pairs of narrow beams.

2. The method of claim 1, further comprising:
   transmitting reference signals on the plurality of narrow beams;
   receiving the one or more UE reports; and
   transmitting, via one of the pairs of beams, a synchronization signal block (SSB).

3. The method of claim 1, wherein:
   determining the pairs of narrow beams comprises determining, based on the beam correlation information, the pairs of narrow beams as a function of a distance between beams in each respective pair of the pairs of narrow beams, and
   the pairs of narrow beams are determined to have a largest possible distance between the beams in each respective pair of the pairs of narrow beams among the plurality of narrow beams to reduce interference between the beams in the respective pairs of narrow beams.

4. The method of claim 1, wherein:
   determining the pairs of narrow beams comprises determining, based on the beam correlation information, the pairs of narrow beams as a function of a distance between beams in different pairs of the pairs of narrow beams, and
   the pairs of narrow beams are determined to have a largest possible distance between the different pairs of beams in the pairs of narrow beams to reduce correlation between the different pairs of beams.

5. The method of claim 1, wherein:
   determining the beam correlation information comprises identifying a beam load for beams in the plurality of beams,
   the beam load is based on a number of UEs served by a narrow beam or a throughput to be carried by a narrow beam, and
   determining the pairs of narrow beams comprises selecting beams to pair as a function of the beam load.

6. The method of claim 1, further comprising:
   receiving updated UE reports including updated information on the plurality of narrow beams;
   determining information about an updated distribution of beams in the pairs of narrow beams based on the updated UE reports; and
   determining whether to modify paring of the pairs of narrow beams as a function of comparison of the updated distribution to a threshold values.

7. The method of claim 1, wherein:
   determining the pairs of narrow beams comprises determining the pairs of narrow beams as a function of a distance between beams in each respective pair of the pairs of narrow beams and distance between beams in different pairs of the pairs of narrow beams, and
   the function includes an integer linear programming (ILP) algorithm.

8. An apparatus comprising:
   memory; and
   a processor operably coupled to the memory, the processor configured to:
      identify, based on one or more user equipment (UE) reports, information on a plurality of narrow beams;
      determine beam correlation information for the plurality of narrow beams based on the identified information in the one or more UE reports;
      determine pairs of narrow beams from among the plurality of narrow beams based on increasing an intra-pair distance between a closest pair of the pairs of narrow beams in the beam correlation information; and
      transmit information using at least one of the determined pairs of narrow beams.

9. The apparatus of claim 8, further comprising a transceiver operably coupled to the processor, the transceiver configured to:
   transmit reference signals on the plurality of narrow beams;
   receive the one or more UE reports; and
   transmit, via one of the pairs of beams, a synchronization signal block (SSB).

10. The apparatus of claim 8, wherein:
    to determine the pairs of narrow beams, the processor is further configured to determine, based on the beam correlation information, the pairs of narrow beams as a function of a distance between beams in each respective pair of the pairs of narrow beams, and
    the pairs of narrow beams are determined to have a largest possible distance between the beams in each respective pair of the pairs of narrow beams among the plurality of narrow beams to reduce interference between the beams in the respective pairs of narrow beams.

11. The apparatus of claim 8, wherein:
    to determine the pairs of narrow beams, the processor is further configured to determine, based on the beam correlation information, the pairs of narrow beams as a function of a distance between beams in different pairs of the pairs of narrow beams, and the pairs of narrow beams are determined to have a largest possible distance between the different pairs of beams in the pairs of narrow beams to reduce correlation between the different pairs of beams.

12. The apparatus of claim 8, wherein:

to determine the beam correlation information, the processor is further configured to identify a beam load for beams in the plurality of beams, the beam load is based on a number of UEs served by a narrow beam or a throughput to be carried by a narrow beam, and to determine the pairs of narrow beams, the processor is further configured to select beams to pair as a function of the beam load.

13. The apparatus of claim 8, further comprising:

a transceiver operably coupled to the processor, the transceiver configured to receive updated UE reports including updated information on the plurality of narrow beams, wherein the processor is further configured to:
  determine information about an updated distribution of beams in the pairs of narrow beams based on the updated UE reports; and
  determine whether to modify paring of the pairs of narrow beams as a function of comparison of the updated distribution to a threshold values.

14. The apparatus of claim 8, wherein:

to determine the pairs of narrow beams, the processor is further configured to determine the pairs of narrow beams as a function of a distance between beams in each respective pair of the pairs of narrow beams and distance between beams in different pairs of the pairs of narrow beams, and the function includes an integer linear programming (ILP) algorithm.

15. A non-transitory, computer-readable medium comprising program code that, when executed by a processor of an apparatus, causes the apparatus to:

identify, based on one or more user equipment (UE) reports, information on a plurality of narrow beams;

determine beam correlation information for the plurality of narrow beams based on the identified information in the one or more UE reports;

determine pairs of narrow beams from among the plurality of narrow beams based on increasing an intra-pair distance between a closest pair of the pairs of narrow beams in the beam correlation information; and transmit information using at least one of the determined pairs of narrow beams.

16. The computer-readable medium of claim 15, further comprising program code that, when executed by the processor of the apparatus, causes the apparatus to:

transmit, via a transceiver of the apparatus, reference signals on the plurality of narrow beams;

receive, via the transceiver, the one or more UE reports; and transmit, via the transceiver on one of the pairs of beams, a synchronization signal block (SSB).

17. The computer-readable medium of claim 15, wherein:

the program code to determine the pairs of narrow beams comprises program code that, when executed by the processor of the apparatus, causes the apparatus to determine, based on the beam correlation information, the pairs of narrow beams as a function of a distance between beams in each respective pair of the pairs of narrow beams, and the pairs of narrow beams are determined to have a largest possible distance between the beams in each respective pair of the pairs of narrow beams among the plurality of narrow beams to reduce interference between the beams in the respective pairs of narrow beams.

18. The computer-readable medium of claim 15, wherein:

the program code to determine the pairs of narrow beams comprises program code that, when executed by the processor of the apparatus, causes the apparatus to determine, based on the beam correlation information, the pairs of narrow beams as a function of a distance between beams in different pairs of the pairs of narrow beams, and the pairs of narrow beams are determined to have a largest possible distance between the different pairs of beams in the pairs of narrow beams to reduce correlation between the different pairs of beams.

19. The computer-readable medium of claim 15, wherein:

the program code to determine the beam correlation information comprises program code that, when executed by the processor of the apparatus, causes the apparatus to identify a beam load for beams in the plurality of beams, the beam load is based on a number of UEs served by a narrow beam or a throughput to be carried by a narrow beam, and the program code to determine the pairs of narrow beams comprises program code that, when executed by the processor of the apparatus, causes the apparatus to select beams to pair as a function of the beam load.

20. The computer-readable medium of claim 15, further comprising program code that, when executed by the processor of the apparatus, causes the apparatus to:

receive, via a transceiver of the apparatus, updated UE reports including updated information on the plurality of narrow beams;

determine information about an updated distribution of beams in the pairs of narrow beams based on the updated UE reports; and determine whether to modify paring of the pairs of narrow beams as a function of comparison of the updated distribution to a threshold values.

* * * * *